United States Patent
Shoykhet

(10) Patent No.: US 9,461,523 B2
(45) Date of Patent: Oct. 4, 2016

(54) TWO PHASE GAP COOLING OF AN ELECTRICAL MACHINE

(71) Applicant: Baldor Electric Company, Fort Smith, AR (US)

(72) Inventor: Boris A. Shoykhet, Beachwood, OH (US)

(73) Assignee: Baldor Electric Company, Fort Smith, AR (US)

( * ) Notice: Subject to any disclaimer, the term of this patent is extended or adjusted under 35 U.S.C. 154(b) by 405 days.

(21) Appl. No.: 14/104,724

(22) Filed: Dec. 12, 2013

(65) Prior Publication Data

US 2015/0171707 A1 Jun. 18, 2015

(51) Int. Cl.
*H02K 9/00* (2006.01)
*H02K 9/12* (2006.01)
*H02K 9/19* (2006.01)

(52) U.S. Cl.
CPC *H02K 9/00* (2013.01); *H02K 9/12* (2013.01); *H02K 9/19* (2013.01)

(58) Field of Classification Search
CPC ............ H02K 9/00; H02K 9/10; H02K 9/12; H02K 9/14; H02K 9/19; H02K 9/193
USPC ............ 310/54, 52, 55, 58, 59, 60 R, 62, 63
See application file for complete search history.

(56) References Cited

U.S. PATENT DOCUMENTS

| | | | |
|---|---|---|---|
| 3,801,843 A | 4/1974 | Corman et al. | |
| 3,805,101 A | 4/1974 | Purman | |
| 4,959,569 A * | 9/1990 | Snuttjer | H02K 9/24 310/55 |
| 6,264,003 B1 | 7/2001 | Dong et al. | |
| 7,741,740 B2 | 6/2010 | Zickermann et al. | |
| 8,035,261 B2 | 10/2011 | Harb et al. | |
| 2003/0034701 A1 | 2/2003 | Weeber et al. | |
| 2003/0107275 A1 | 6/2003 | Gamble et al. | |
| 2005/0194847 A1* | 9/2005 | Gromoll | H02K 9/20 310/54 |
| 2007/0063594 A1* | 3/2007 | Huynh | H02K 9/00 310/59 |
| 2007/0075595 A1 | 4/2007 | Narayanan et al. | |
| 2011/0148229 A1* | 6/2011 | Esse | H02K 9/19 310/54 |
| 2011/0241453 A1 | 10/2011 | Idland et al. | |
| 2014/0042841 A1* | 2/2014 | Rippel | H02K 9/19 310/54 |

FOREIGN PATENT DOCUMENTS

WO 2009106463 A1 9/2009

* cited by examiner

*Primary Examiner* — Michael Andrews
(74) *Attorney, Agent, or Firm* — Thompson Coburn LLP

(57) ABSTRACT

An electro-dynamic machine has a rotor and stator with a gap therebetween. The machine has a frame defining a hollow interior with end cavities on axially opposite ends of the frame. A gas circulating system has an inlet that supplies high pressure gas to the frame interior and an outlet to collect gas passing therethrough. A liquid coolant circulating system has an inlet that supplies coolant to the frame interior and an outlet that collects coolant passing therethrough. The coolant inlet and gas inlet are generally located on the frame in a manner to allow coolant from the coolant inlet to flow with gas from the gas inlet to the gap. The coolant outlet and gas outlet are generally located on the frame in a manner to allow the coolant to be separated from the gas with the separated coolant and gas collected for circulation through their respective circulating systems.

13 Claims, 4 Drawing Sheets

TWO PHASE GAP COOLING OF AN ELECTRICAL MACHINE

STATEMENT REGARDING FEDERALLY SPONSORED RESEARCH OR DEVELOPMENT

This invention was made with government support under agreement No. DE-AR0000191 awarded by the Department of Energy. The government has certain rights in this invention.

BACKGROUND AND SUMMARY

In synchronous reluctance permanent magnet motors, interior permanent magnet motors, and surface permanent magnet motors, the rotor often becomes the hottest part of the motor during operation as it is the most difficult to effectively cool. The excessive temperature tends to degrade magnet performance and motor efficiency. Often in these types of motors, excessive heat is transferred from the rotor to the stator through the gap between the rotor and the stator. Thus, in addition to an increase of rotor temperature, stator temperature also increases. While liquid coolants, such as oil, may be used in the interior of the motor to cool the internal motor components, traditional methods of cooling with liquid coolants typically result in prohibitively high friction and windage losses. For instance, the internal volume of the motor may be filled with oil to cool internal motor components, and a pump may be used to circulate the oil through the motor. Filling the internal volume of the motor with oil, typically creates high friction and windage losses.

These disadvantages may be overcome. Substantial cooling of electrical machines may be achieved by directing a mixture of gas and cooling liquid or coolant, (for instance, oil and air) through the gap between the rotor and stator of the electro-dynamic machine. The amount of coolant is controlled to maintain friction and windage losses at an acceptable level. The gas may be pressurized to generate the flow of the gas and coolant mixture through the gap. As will be further discussed in great detail below, the methods and constructions of the electro-dynamic machine enable the gas-coolant mixture to be directed to the gap between a rotor and stator, thereby putting the rotor in close contact with the gas-coolant mixture for enhanced cooling of the electrical machine.

DESCRIPTION OF THE DRAWING FIGURES

DETAILED DESCRIPTION

Figure 1:
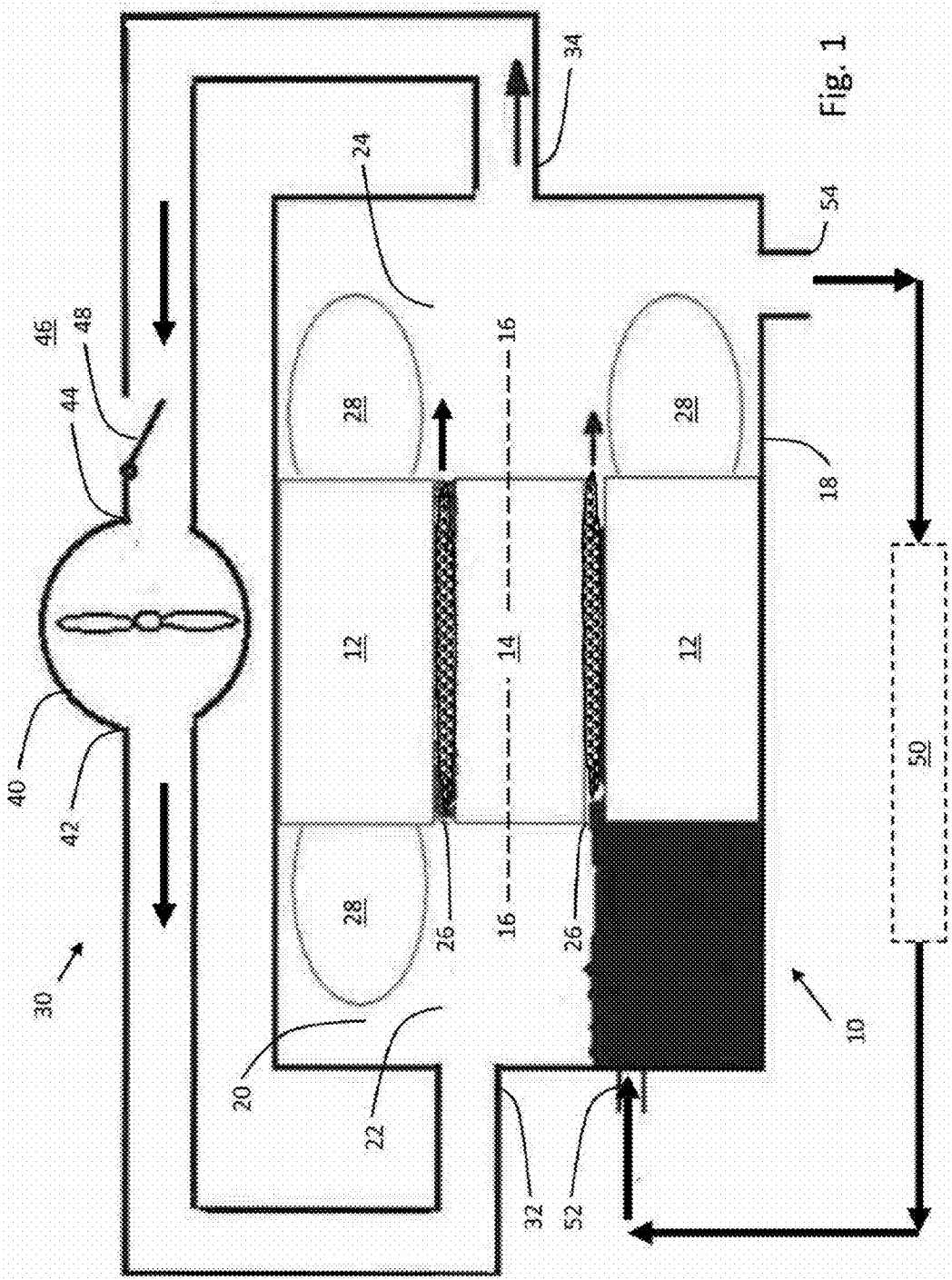
FIG. 1 shows a schematic diagram of an embodiment of a system for two phase gap cooling of an electrical machine.

Although the embodiments described below are in the context of an electrical motor, the principles disclosed herein may be used with any electro-dynamic machine, such as a generator or other rotating electrical machine, and not intended to be limiting in any sense. Also, although the term "oil" is used in the description, the use is not intended to limit the embodiments in any sense, and any suitable liquid coolants may be used instead of oil, including by way of example, oil based coolants, water based coolants, synthetic fluids, etc. Also, although the term "gas" is used in the description, the use is not intended to limit the embodiments in any sense, and any suitable gas may be used, including air. Also, the terms "top", "bottom", "left," and right" are used in the description that follows for ease of describing features illustrated in the drawings, and their use is not intended to limit any of the embodiments so described.

The motor 10 comprises a stator 12 and a rotor 14. The rotor 14 has a center axis 16 of rotation and the stator 12 is concentrically located with the rotor. Typically, the stator 12 has a hollow center and the rotor 14 is rotatably disposed within the hollow center of the stator. Although the drawings show the rotor disposed within the center of the stator, other configurations may be utilized, including a stator disposed within a cylindrical center of a rotor. A frame 18 may surround the stator 12 and the rotor 14 and define a hollow interior 20 for the motor. The frame 18 may be formed integrally or monolithically with the stator or comprise a portion of the stator. For instance, when the stator is formed from a plurality of laminations, the outer surfaces of the stator laminations may form the frame as the outer surfaces of the stator laminations define a portion of the exterior of the motor. Alternatively, the frame may define a main cavity with a hollow cylindrical portion in which the stator is mounted. The frame may also define end cavities 22,24 at the axial ends of the motor. For instance, the frame may comprise end caps that are mounted to the axial ends of a stator core of contiguous laminations stacked side by side. Thus, in such an arrangement, the end caps define end cavities of the frame, and together the end caps and the stator define the frame of the electrical machine. Each of these embodiments is intended to be illustrative and not limiting in any sense, and frame is meant to describe any structure of the motor which defines an interior cavity for the motor. The rotor 14 is spaced from the stator 12 to form a gap 26. End coils 28 of the stator windings may be disposed in the end cavities 22,24.

The motor 10 may further comprise a gas circulating system 30. The gas circulating system 30 may have an inlet 32 that supplies gas to the hollow interior of the frame and a gas outlet 34 to collect gas passing through the frame hollow interior. The gas inlet 32 may comprise a manifold (e.g., '36' in FIG. 2) communicating with the hollow interior of the frame. The gas outlet may also comprise a manifold (e.g., '38' in FIG. 2) communicating with the hollow interior of the frame.

The gas circulating system 30 may be configured to create a pressure differential such that the gas inlet is at a higher pressure than the gas outlet sufficient to allow a gas to flow between the gas inlet and the gas outlet through the hollow interior of the frame of the motor. The gas circulating system may operate below atmospheric pressure so the differential pressure between the gas inlet and the gas outlet may be based upon a relative level of vacuum. In the alternative, as shown in the drawings, the differential pressure of the gas circulating system is generated with a pressurizing source 40 configured to generate a high pressure gas at a high pressure side 42 of the pressurizing source. The pressurizing source may comprise a fan. The pressurizing source may also comprise a compressor. Opposite of the high pressure side 42 of the pressurizing source 40 is a low pressure side or suction side 44. The high pressure side 42 may be arranged in communication with the gas inlet 32 and/or gas inlet manifold 36. The low pressure side 44 may be in communication with the gas outlet 34 and/or gas outlet manifold 38. The low pressure side 44 may be connected to a reservoir 46 with a valve positioned 48 therebetween. The valve 48 may be configured to place the low pressure side 44 in communication with the reservoir 46 when pressure at the low pressure side is below the pressure of the reservoir. The valve 48 may comprise a check valve. The reservoir 46 may comprise atmosphere. For instance, when air is the working fluid in the gas circulating system, the supply of air may be drawn from atmosphere through the check valve. The check valve may be biased to allow it to open when pressure at the low pressure side is below the pressure of the reservoir. Depending upon the arrangement of the gas outlet, the manifold associated with the gas outlet, and/or the low pressure side of the pressurizing source and the relative location of the valve, the valve may open when pressure in the gas outlet, the gas outlet manifold, or the low pressure side of the pressurizing source is below atmosphere pressure. The reservoir may comprise an accumulator or a tank of pressurized gas. The working fluid of the gas circulating system may comprise air or another compressible fluid.

The system may also include a liquid coolant circulating system 50. The liquid coolant circulating system 50 may include a liquid coolant inlet 52 for supplying liquid coolant to the frame hollow interior 20. The circulating system may also comprise a liquid coolant outlet 54 that communicates with the frame hollow interior 20 to collect liquid coolant passing through the frame hollow interior for circulation through the liquid coolant circulation system. The liquid coolant inlet 52 may comprise a liquid coolant inlet manifold 56. The liquid coolant outlet 54 may comprise a liquid coolant outlet manifold 58. The liquid coolant circulation system 50 may also include a heat exchanger to cool the liquid coolant and a pump for circulating the liquid coolant. The liquid coolant circulating system may also include a sump or reservoir. Components of the liquid coolant circulating system are not shown in the drawings to facilitate illustration of other components of the system. As mentioned previously, the amount of liquid coolant introduced into the motor interior hollow frame is sufficient to provide cooling while not significantly increasing friction or windage losses. The working fluid of the oil circulating system may comprise oil or another liquid coolant having sufficient cooling properties.

FIG. 1 is a schematic diagram of one embodiment of a system for two phase gap cooling of an electric motor. In FIG. 1, liquid coolant is supplied to the gap 26 between the rotor 14 and the stator 12 by partially filling the left end cavity 22 with liquid coolant. The liquid coolant inlet 52 is arranged at or adjacent to the bottom of the left end cavity 22, and the gas inlet 32 is arranged at or adjacent to the top of the left end cavity. The working fluid of the gas circulating system is air and the check valve 48 opens to atmosphere 46. The air is circulated in the gas circulating 30 system by a fan 40. The liquid coolant level is filled until the liquid coolant level reaches the rotor 14 and the gap 26. In this example, the liquid coolant is oil. The rotor 14 is configured to supply liquid coolant to the gap 26 during rotation. The left end cavity 22 is pressurized by the fan 40 and the air/oil mixture is formed in the gap 26. The air/oil mixture has two velocity components: circumferential velocity from rotation of the rotor and axial velocity from the pressurized fan. The mixture is directed through the gap into the axially opposite right end cavity 24. The oil is separated from the air in the right end cavity. The gas outlet 34 is arranged at or adjacent to the top of the end cavity 24 while the liquid coolant outlet 54 is arranged at or adjacent to the bottom of the right end cavity. Through gravity, the oil and air are separated. The oil is directed through the liquid coolant outlet 54 to other components of the liquid coolant circulating system 50, such as a heat exchanger, sump, etc. (not shown), and returned to the liquid coolant inlet 52. Air is collected in the right end cavity 24 and directed to the gas outlet 34 into the gas circulation system 30. A small amount of oil or oil mist may be entrained in the air returning to the gas circulation system. Additionally, air may be entrained in the oil collected by the liquid coolant outlet and circulated back through the liquid coolant circulation system. In order to provide a constant flow of air through the gas circulation system, the check valve 48 may be provided on the suction side of the fan 40. The valve may open if pressure on the suction side 44 of the fan 40 drops below atmospheric pressure. Thus, the pressure in any location inside the motor is at or above atmospheric pressure.

Figure 2:
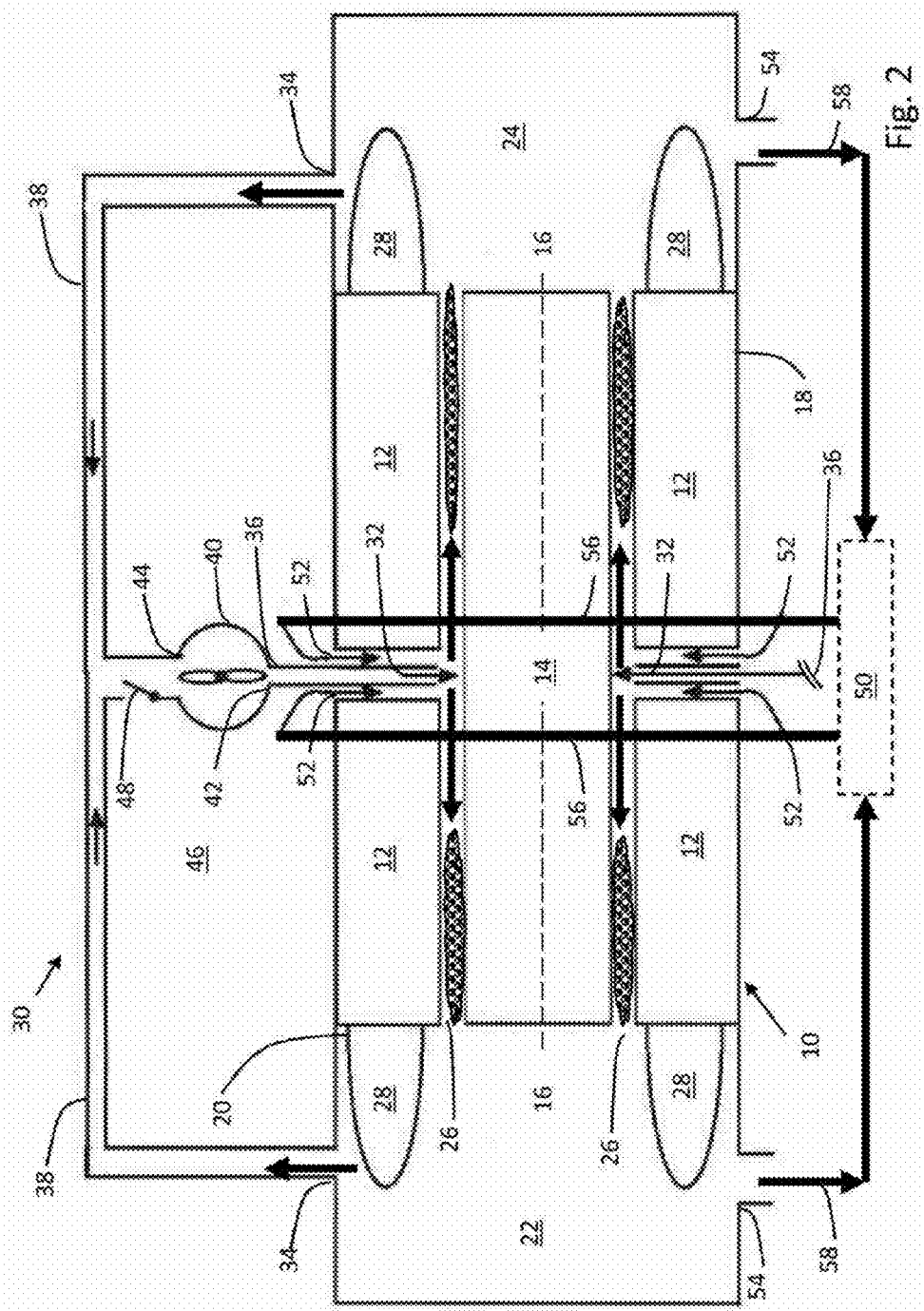
FIG. 2 shows a schematic diagram of an alternate embodiment of a system of two phase gap cooling of an electrical machine.

FIG. 2 is a schematic drawing of another embodiment of a system for two phase gap cooling of an electrical motor. The embodiment shown in FIG. 2 is similar in many respects to the embodiment shown in FIG. 1, and thus, only the differences will be discussed below. In FIG. 2, the liquid coolant inlet 52 and gas inlet 32 are formed in the main cavity of the frame so that the air/oil mixture may be directed into an axial center of the gap 26 and flow axially outward therefrom to each end cavity 22,24. Narrow radial ducts may be made in the motor middle plane. For instance, a plurality of radial ducts may be equiangularly spaced about the motor middle plane with a portion of the ducts used for air flow (i.e., the gas inlet 32) and the other portion used for oil flow (i.e., the liquid coolant inlet 52). The liquid coolant inlet manifold 56 and the gas inlet manifold 36 may communicate with the ducts comprising the liquid coolant inlet 52 and gas inlet 32. Alternatively, the ducts may each have a passageway, for instance, a central passageway, used for gas flow, and a passageway, for instance, surrounding the central passageway, used for liquid coolant flow. The liquid coolant inlet manifold 56 may circumscribe the frame 18 and/or stator 12 and have radial passages (i.e., the liquid coolant inlet 52) through the stator to the gap 26. The gas inlet manifold 36 may also circumscribe the frame 18 and/or stator 12 and have radial passages (i.e., the gas inlet 32) through the stator to the gap 26. Upon reaching the gap 26, the air/oil mixture may split with one portion of the mixture being directed to the left end cavity 22 and the other portion of the mixture being directed to the right end cavity 24. When the mixture leaves the gap, the oil is separated from the air by gravity as described in the embodiment of FIG. 1. In the embodiment shown in FIG. 2, the liquid coolant outlet 54 may comprise a manifold 58 to collect the oil from both the left and right end cavities 22,24 and direct it to the liquid coolant circulating system before returning the oil to the liquid coolant inlet 52 and inlet manifold 56. Likewise, the gas outlet 34 may comprise a manifold 38 to collect the separated gas from the left and right end cavities 22,24 and direct it to the suction side 44 of the fan 40. In the embodiment in FIG. 2, the amount of liquid coolant may be metered in the liquid coolant inlet manifold and/or inlet to provide an amount of liquid coolant into the gap sufficient for cooling the motor while preventing a significant increase in friction and windage losses.

Figure 3:
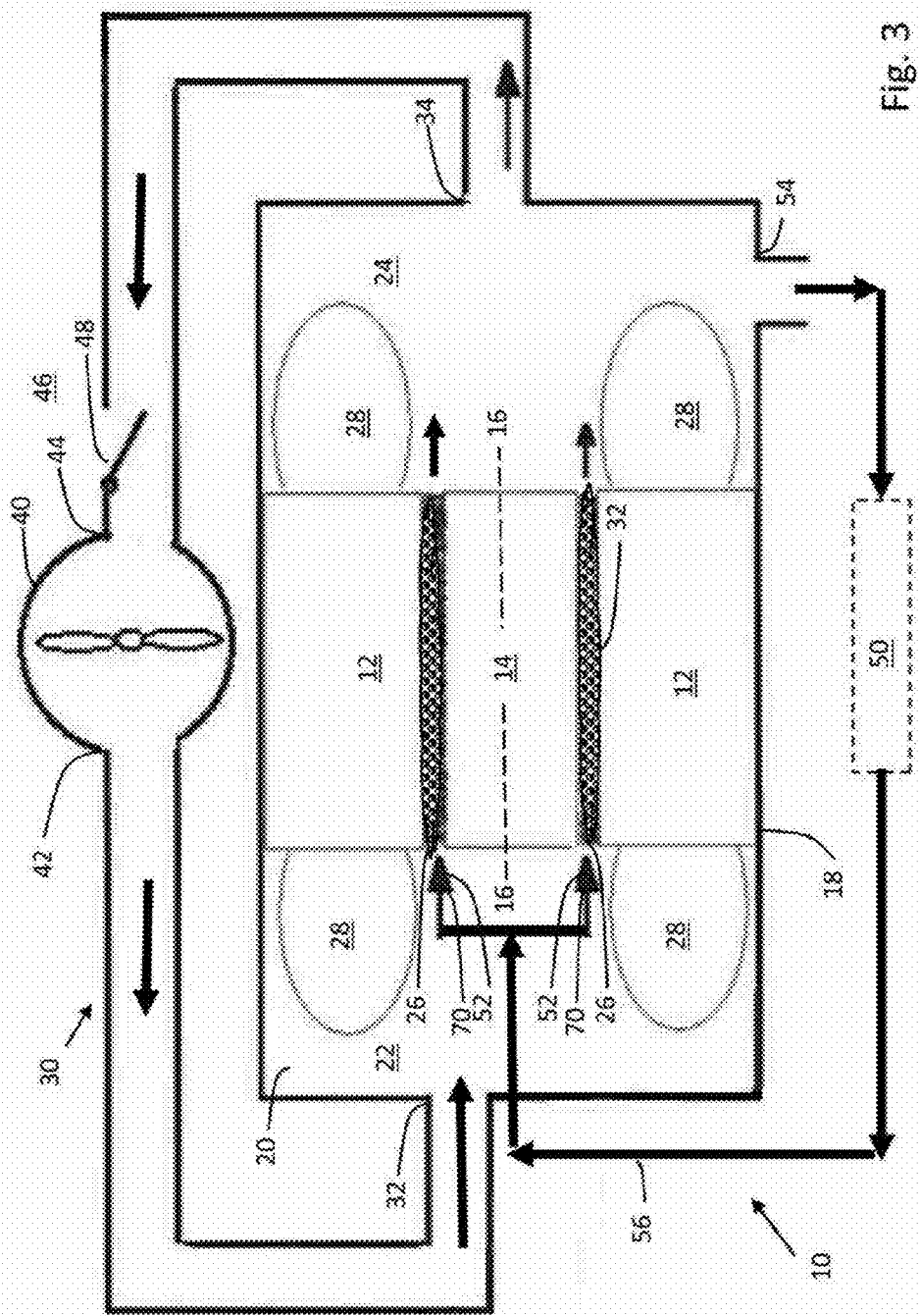
FIG. 3 shows a schematic diagram of an alternate embodiment of a system of two phase gap cooling of an electrical machine.

FIG. 3 is a schematic diagram of another embodiment of a system for two phase cooling of an electric motor. The embodiment shown in FIG. 3 is similar in many respects to the embodiments of FIGS. 1 and 2, and thus, only the differences will be discussed below. In FIG. 3, the liquid coolant inlet 52 comprises a plurality of injectors 70 arranged at or adjacent to the gap 26 in the left axial end cavity 22 at the left axial end of the rotor 14. Oil is directed directly into the gap 26 through the injectors 70. The gas circulation system 30 is similar to the system of the embodiment of FIG. 1. Pressurized air from the gas circulation system 30 enables the oil injected into the gap to be directed through the gap and separated in the right end cavity 24. Once the oil is separated in the right end cavity, it may be collected by the liquid coolant outlet 54 and directed to the liquid coolant circulation system 50 for return to the injectors 70. The air separated from the oil may be collected in the gas outlet 34 and returned to the gas circulation system 30. The injectors 70 may communicate with the liquid coolant inlet manifold 56. The liquid coolant inlet manifold 56 may comprise a circular ring with axial ports equiangularly spaced around the manifold directing liquid coolant into injectors 70 and the gap 26. The liquid coolant may be metered at the liquid coolant inlet manifold and/or injectors to supply an amount of liquid coolant to the gap sufficient for cooling while preventing a significant increase in friction and windage losses in the motor.

Figure 4:
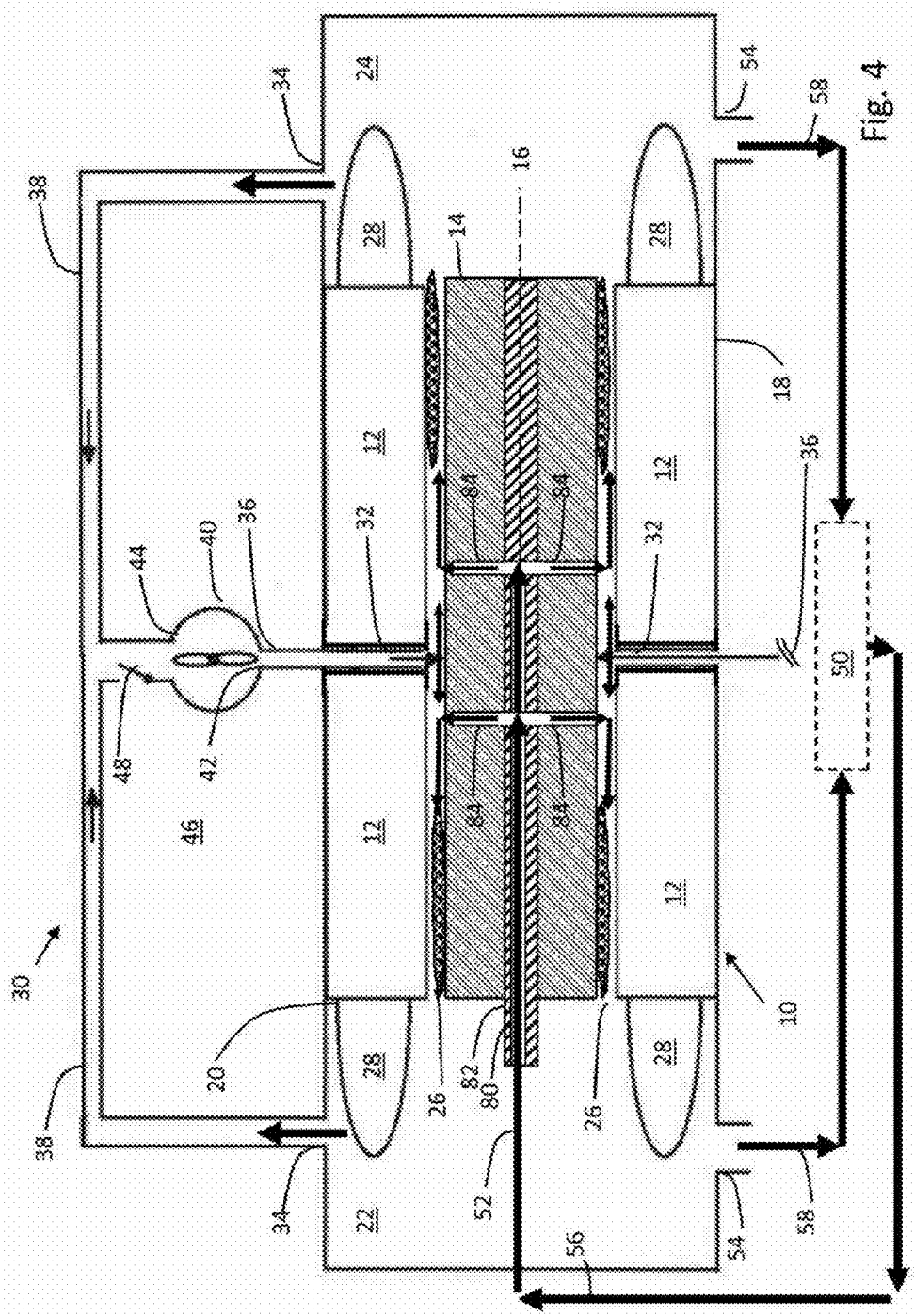
FIG. 4 shows a schematic diagram of an alternate embodiment of a system of two phase gap cooling of an electrical machine.

FIG. 4 is a schematic diagram of another embodiment of a system for two phase cooling of an electric motor. The embodiment shown in FIG. 4 is similar in many respects to the embodiments of FIGS. 1-3, and thus, only the differences will be discussed below. In FIG. 4, the gas inlet 32 is formed in the main cavity of the frame so that the gas may be directed into an axial center of the gap 26 and flow axially outward therefrom to each end cavity 22,24. Narrow radial ducts may be made in the motor middle plane. For instance, a plurality of radial ducts may be equiangularly spaced about the motor middle plane and form the gas inlet 32. The gas inlet manifold 36 may communicate with the ducts comprising the gas inlet 32. In FIG. 4, the liquid coolant inlet 52 may communicate with a passageway 80 formed in a shaft 82 of the rotor in an area in the left axial end cavity 22 at the left axial end of the rotor 14. The liquid coolant flows through the hollow shaft 82 and is directed into the gap 26 through the radial ports 84 formed in the rotor that communicate with the hollow shaft. In the drawings, a first set of equiangularly spaced radial ports 84 are shown on a left axial side of the rotor to the left of the gas inlet, and a second set of equiangularly spaced radial ports 84 are shown on a right axial side of the rotor to the right of the gas inlet. The coolant inlet ports may also be provided on one end of the rotor, for instance, the left axial end of the rotor so the flow of coolant and gas extends in one direction along the rotor and stator from a left axial end to the right axial end. Also, multiple sets may be provided on the rotor and arranged in a spaced apart formation along the axial length of the rotor. The gas circulation system 30 may be similar to the system of the embodiment of FIG. 2. Pressurized air from the gas circulation system 30 enables the oil injected into the gap to be directed through the gap. Upon reaching the gap 26, the air may splits with one portion being mixed with the oil and the mixture being directed to the left end cavity 22, and the other portion of air being mixed with the oil and the mixture being directed to the right end cavity 24. When the mixture leaves the gap, the oil is separated from the air by gravity as described in the embodiment of FIG. 1. In the embodiment shown in FIG. 4, the liquid coolant outlet 54 may comprise a manifold 58 to collect the oil from both the left and right end cavities 22,24 and direct it to the liquid coolant circulating system before returning the oil to the liquid coolant inlet 52 and inlet manifold 56. Likewise, the gas outlet 34 may comprise a manifold 38 to collect the separated gas from the left and right end cavities 22,24 and direct it to the suction side 44 of the fan 40. In the embodiment in FIG. 4, the amount of liquid coolant may be metered at the liquid coolant inlet manifold 56 and/or inlet 52 to provide an amount of liquid coolant into the gap sufficient for cooling the motor while preventing a significant increase in friction and windage losses.

In a configuration where coolant is directed through a shaft in the rotor to a set of ports on an axial end of the rotor, the gas may be injected directly into the gap with injectors that communicate with the gas inlet. For instance, a plurality of gas injectors may be arranged at or adjacent to the gap in the left axial end cavity at the left axial end of the rotor. The gas inlet manifold may comprise a circular ring with axial ports equiangularly spaced around the manifold directing gas into the injectors and the gap. In this configuration, the air separated from the oil may be collected in the gas outlet and returned to the gas circulation system. In this configuration, the liquid coolant may be metered at the liquid coolant inlet manifold and/or inlet to supply an amount of liquid coolant to the gap sufficient for cooling while preventing a significant increase in friction and windage losses in the motor.

In view of the foregoing, it will be seen that several advantages are achieved and attained. The embodiments were chosen and described in order to best explain the principles of the disclosure and their practical application to thereby enable others skilled in the art to best utilize the principles of the various embodiments and with various modifications as are suited to the particular use contemplated. As is seen in the above description, by choosing proper parameters of gas flow and liquid coolant flow, it is possible to keep friction and windage losses in the gap at an acceptable level and obtain significant cooling of the rotating electrical machine. As various modifications could be made in the constructions and methods herein described and illustrated without departing from the scope of the invention, it is intended that all matter contained in the foregoing description or shown in the accompanying drawings shall be interpreted as illustrative rather than limiting. The breadth and scope of the present invention should not be limited by any of the above-described exemplary embodiments, but should be defined only in accordance with the following claims appended hereto and their equivalents.

What is claimed is:

1. An electro-dynamic machine comprising:
   a rotor having a center axis of rotation;
   a stator concentrically located with the rotor and spaced from the rotor to define a gap therebetween;
   a frame defining a hollow interior for the machine, the frame comprising a generally cylindrical main cavity extending axially through the frame with the rotor being substantially housed in the main cavity, and first and second end cavities being disposed on axially opposite ends of the frame;
   a gas circulating system having a gas inlet to supply gas to the frame hollow interior and a gas outlet to collect gas passing through the frame hollow interior for circulation through the gas circulating system, the gas circulating system being configured to form a pressure difference sufficient to allow gas to flow through the gas circulating system and the hollow interior of the frame with the gas inlet being at a higher pressure than the gas outlet, the gas inlet being in communication with a high pressure side of the gas circulating system and the gas outlet being in communication with a low pressure side of the gas circulating system, the low pressure side being connected to a reservoir with a valve disposed therebetween configured to place the low pressure side in communication with the reservoir when pressure at the low pressure side is below pressure in the reservoir; and a liquid coolant circulating system having a liquid coolant inlet communicating with the frame hollow interior to supply liquid coolant to the frame hollow interior and a liquid coolant outlet communicating with the frame hollow interior to collect liquid coolant passing through the frame hollow interior for circulation through the liquid coolant circulating system;

wherein the liquid coolant inlet and gas inlet are generally located on the frame in a manner to allow liquid coolant from the liquid coolant inlet to flow with gas from the gas inlet to the gap; and wherein the liquid coolant outlet and gas outlet are generally located on the frame in a manner to allow the liquid coolant passing through the frame to be separated from the gas passing through the frame with the separated liquid coolant collected for circulation through the liquid coolant circulating system and the separated gas collected for circulation through the gas circulating system.

2. The machine of claim 1, wherein the gas inlet and liquid coolant inlet communicate with the first axial end cavity of the frame.

3. The machine of claim 2, wherein the gas outlet and the liquid coolant outlet communicate with the second axial end cavity of the frame.

4. The machine of claim 1, wherein the gas inlet and liquid coolant inlet communicate with the main cavity of the frame.

5. The machine of claim 1, wherein the liquid coolant inlet communicates with the main cavity of the frame.

6. The machine of claim 1, wherein the gas circulating system pressure difference is generating by a fan.

7. The machine of claim 1, wherein the low pressure reservoir comprises atmosphere.

8. The machine of claim 1, wherein the liquid coolant outlet is arranged on a bottom portion of the frame opposite a top portion of the frame.

9. The machine of claim 1, wherein the rotor is configured to circulate at least a portion of the liquid coolant from the liquid coolant inlet to the gap.

10. The machine of claim 1, wherein the liquid coolant outlet communicates with each axial end cavity.

11. The machine of claim 1, wherein the gas outlet communicates with each axial end cavity.

12. The machine of claim 5, wherein the liquid coolant inlet is adjacent to the gap.

13. The machine of claim 12, wherein the liquid coolant inlet communicates with a passageway formed in a shaft of the rotor.

* * * * *